(12) United States Patent
Egami

(10) Patent No.: US 7,943,557 B2
(45) Date of Patent: May 17, 2011

(54) GREASE FOR HUB BEARING AND HUB BEARING

(75) Inventor: Masaki Egami, Kuwana (JP)

(73) Assignee: NTN Corporation, Osaka (JP)

( * ) Notice: Subject to any disclaimer, the term of this patent is extended or adjusted under 35 U.S.C. 154(b) by 586 days.

(21) Appl. No.: 11/921,377

(22) PCT Filed: Jun. 6, 2006

(86) PCT No.: PCT/JP2006/311287
§ 371 (c)(1),
(2), (4) Date: Nov. 30, 2007

(87) PCT Pub. No.: WO2006/132220
PCT Pub. Date: Dec. 14, 2006

(65) Prior Publication Data
US 2009/0208157 A1    Aug. 20, 2009

(30) Foreign Application Priority Data
Jun. 7, 2005    (JP) .................................. 2005-166803

(51) Int. Cl.
*C10M 169/04*    (2006.01)
(52) U.S. Cl. ........................................ 508/110; 508/113
(58) Field of Classification Search .................. 508/113, 508/116, 110
See application file for complete search history.

(56) References Cited

U.S. PATENT DOCUMENTS

| 5,223,161 | A | 6/1993 | Waynick |
| 2003/0158052 | A1 | 8/2003 | Akiyama |
| 2004/0033911 | A1 | 2/2004 | Mikami |
| 2006/0073989 | A1* | 4/2006 | Fujita et al. ................. 508/116 |
| 2007/0179066 | A1* | 8/2007 | Sakamoto et al. ............ 508/113 |

FOREIGN PATENT DOCUMENTS

CN    1487063 A    7/2004
(Continued)

OTHER PUBLICATIONS

EP Search Report Dated Jul. 22, 2010.

*Primary Examiner* — Michael A Marcheschi
*Assistant Examiner* — Chantel Graham
(74) *Attorney, Agent, or Firm* — Hedman & Costigan, P.C.; James V. Costigan

(57) ABSTRACT

A hub bearing, of carbon steel for machine use, which has a long life because of improved resistance to peeling starting from the surface and a grease enclosed in the hub bearing which contains a base oil and a thickener, and in the base oil, the number of naphthenic carbons found by an n-d-M ring analyzing method accounts for 32 to 37% of a whole number of carbon atoms in the base oil. The base oil is a mineral oil or a mixed oil of a mineral oil and a synthetic hydrocarbon oil. The thickener contains 1 to 40 mass % of a urea compound of formula (1):

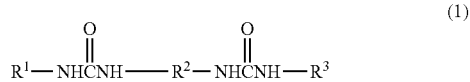

where $R^2$ indicates an aromatic hydrocarbon group having 6 to 15 carbon atoms, and $R^1$ and $R^3$ indicate at least one hydrocarbon group selected from an alicyclic hydrocarbon group and an aromatic hydrocarbon group.

12 Claims, 2 Drawing Sheets

FOREIGN PATENT DOCUMENTS

| | | |
|---|---|---|
| JP | 01-275698 | 11/1989 |
| JP | 11-279579 | 10/1999 |
| JP | 11-302682 | 11/1999 |
| JP | 2003-221588 | 8/2003 |
| JP | 2003-239999 | 8/2003 |
| JP | 2004-169862 | 6/2004 |
| WO | WO2004061058 * | 7/2004 |
| WO | WO2005083043 * | 9/2005 |

* cited by examiner

GREASE FOR HUB BEARING AND HUB BEARING

This application is a Section 371 application of PCT/JP2006/311287, which claims the priority of Japanese Appln. Serial No. P2005-166803, filed June 7, 2005.

TECHNICAL FIELD

The present invention relates to grease for a hub bearing for rotatably supporting wheels of a car and to the hub bearing.

BACKGROUND ART

Till the 1970s, in the hub bearing for use in a car, the design of arranging two standard bearings conforming to ISO specification was mainly adopted. In the 1980s, to provide improvement in the mounting of the bearing on the car, car makers came to adopt a double row angular contact ball bearing or a double row tapered roller bearing in which outer rings of bearings arranged were held together as a unit with the backs of the bearings opposed to each other. These hub bearings are called the first generation hub bearing (GEN 1). By holding the outer rings together as a unit, an initial axial gap was set to a proper value in assembling the hub bearing. Thus it was unnecessary to adjust a preload in mounting the hub bearing on the car. Thereafter a double row bearing, having a flange portion provided on the outer ring, which is called the second generation hub bearing (GEN 2) was developed. Because merely the arrangement of two standard bearings had a limitation in a decrease of the weight and size of the hub bearing, a shaft (hub ring) and a housing (knuckle) which are peripheral parts of the bearing were held together as a unit to decrease the number of parts and the weight of the hub bearing. By changing the fixing of the hub bearing to the knuckle from press fit to bolt tightening, it became easy to mount the hub bearing on the car. In the third generation hub bearing (GEN 3), the shaft (hub ring) and the inner ring of the bearing were held together as a unit to remove excess thickness, and the line-assembling efficiency was improved. Recently the fourth generation hub joint (GEN 4) in which the hub bearing and a constant velocity joint are held together as a unit has been developed.

Recently the GEN 2 and the GEN 3 are increasingly adopted because as described above, in the GEN 2 and the GEN 3, the workability in mounting the bearing on the car is improved considerably, stability in travel of the car is improved owing to a decreases in the amount of a spring load caused by the elimination of press fit, and the use of a knuckle made of a light alloy effective for decreasing fuel expenses can be adopted.

Paying attention to the material of the bearing, till the adoption of the GEN 1, ordinary bearing steel (for example, SUJ2) was used. In the GEN 2 and the GEN 3 having the flange mounted on the outer ring, the carbon steel for machine structural use such as S53C which has a favorable forgeability and is inexpensive came to be used. The carbon steel for machine structural use secures the rolling fatigue strength of the bearing portion by heat-treating the raceway portion with a high-frequency wave. But the carbon steel for machine structural use has a low surface strength because it contains a small amount of an alloy component and is inferior to the bearing steel in the resistance of the bearing to peeling starting from the surface thereof. Therefore in the same lubricating specification as that for the GEN 1, the carbon steel for machine structural use used in the GEN2 and the GEN3 has an inferior durability when use conditions therefor are strict.

Regarding the improvement of the grease for the hub bearing, the decrease of the rotational torque by the adoption of a low-viscosity base oil (see patent document 1) and the impartation of conductivity for the removal of static electricity (see patent document 2) are known. But since the adoption of the GEN2, no progress has been made on the improvement of the resistance of the hub bearing to the peeling starting from the surface thereof. Because the weights of parts are decreased to reduce fuel expense and improve operation stability, the size of the hub bearing is necessarily decreased, and owing to a rise of a face pressure, the lubricating condition has become strict.

There is a possibility that a tire-driving method using an in-wheel motor is adopted in the future. In that case, it is forecast that the temperature of the hub bearing will rise and the lubricating condition will be strict.

Patent document 1: Japanese Patent Application Laid-Open No. 2003-239999

Patent document 2: Japanese Patent Application Laid-Open No. 2004-169862

DISCLOSURE OF THE INVENTION

Problems to be Solved by the Invention

The present invention has been made to solve the problems and has for its object to provide a hub bearing, made of carbon steel for machine structural use, which has a long life even in a strict lubricating condition by improving the resistance of the hub bearing to peeling starting from the surface thereof.

Means for Solving the Problems

The grease of the present invention for a hub bearing is enclosed in the hub bearing for rotatably supporting wheels of a car. The grease contains a base oil and a thickener, and in the base oil, the number of naphthenic carbons found by an n-d-M ring analyzing method accounts for 32 to 37% of a whole number of carbon atoms.

The n-d-M ring analyzing method is a method (ASTM D 3238-80) of estimating an aromatic component, a naphthenic component, and a paraffin component in oil based on an empirical formula from n (refractive index), d (density), M (average molecular weight), and a sulfur concentration. In the present invention, the number of naphthenic carbons means the number of carbon atoms composing the naphthenic component, namely, naphthenic hydrocarbon contained in the base oil. The ratio of the number of naphthenic carbons is hereinafter expressed as the amount of naphthenic carbons (%).

The base oil is mineral oil, mixed oil consisting of a plurality of mineral oil, or mixed oil of mineral oil and synthetic hydrocarbon oil.

The thickener is a diurea compound.

The diurea compound is a compound shown by the following formula (1) and is contained at 1 to 40 mass % for entire grease.

[Chemical formula 1]

(1)

In the formula (1), $R^2$ indicates an aromatic hydrocarbon group having 6 to 15 carbon atoms, and $R^1$ and $R^3$ indicate at least one hydrocarbon group selected from an alicyclic hydrocarbon group and the aromatic hydrocarbon group.

The hub bearing of the present invention has a sliding contact portion made of carbon steel for machine structural use. The grease for the hub bearing is enclosed therein.

The sliding contact portion means, for example in the hub bearing shown on FIG. 1, a rolling contact portion between an inward member having a hub ring and an inner ring and double row rolling elements and between an outward member consisting of an outer ring and the double row rolling elements. The double row rolling elements are disposed between the inward member and the outward member. The rolling contact portion is called a raceway portion which is heat-treated with a high-frequency wave.

The grease is enclosed in a ring-like space surrounded with the inward member, the outward member, and two sealing members mounted to seal the space between both members with the sealing members axially sandwiching the double row rolling elements therebetween.

Effect of the Invention

Grease for a hub bearing of the present invention is enclosed in the hub bearing for rotatably supporting wheels of a car. The grease contains the base oil and the thickener. The amount of naphthenic carbons of the base oil is set to the predetermined range. Therefore it is possible to suppress the peeling starting from the surface of the hub bearing for use in a car. The bearing in which the raceway ring is composed of the carbon steel for machine structural use has a long life, even though the lubricating condition is strict.

The hub bearing of the present invention contains the base oil and the thickener. The grease in which the amount of naphthenic carbons of the base oil is set to the predetermined range is enclosed in the bearing. Therefore it is possible to suppress the peeling starting from the surface, even though the carbon steel for machine structural use is used for the raceway ring, and further the bearing has a long life, even though the lubricating condition is strict.

BEST MODE FOR CARRYING OUT THE INVENTION

The hub bearing of the present invention is made of carbon steel for machine structural use, and a raceway portion thereof is made of a material heat-treated with a high-frequency wave. The hub bearing has the above-described material at a portion thereof where a rolling element rolls. Grease lubricates the rolling contact portion of the hub bearing.

As a result of the investigation into the durability of the hub bearing, it has been found that the hub bearing in which the grease containing the thickener and the base oil having the number of naphthenic carbons at 32 to 37% of the whole number of carbon atoms is enclosed has improved lubricating performance in its rolling contact portion. The present invention has been completed based on the finding.

The base oil which can be used in the present invention is composed of at least one kind of mineral oil in which the amount of naphthenic carbons found by the n-d-M ring analyzing method is 32 to 37%. Naphthene mineral oil in which the amount of naphthenic carbons is 32 to 37% can be used singly in the present invention. By mixing paraffin mineral oil having a low amount of naphthenic carbons with the naphthene mineral oil having a high amount of naphthenic carbons, prepared mixed oil can be used by so adjusting the mixing ratio that the amount of naphthenic carbons of the prepared mixed oil is 32 to 37%. As an example, by mixing mineral oil (Super oil N100 produced by Nippon Oil Corporation) having the amount of naphthenic carbons at 29.0% and mineral oil (CLESAF F150 produced by Nippon Oil Corporation) having the amount of naphthenic carbons at 40.8% at a mass mixing ratio of 1:1, it is possible to produce mixed base oil having the amount of naphthenic carbons at 35%.

If the amount of naphthenic carbons contained in the oil which is used in the present invention is less than 32%, the bearing has a short life when the lubricating condition is strict. If the amount of naphthenic carbons is more than 37%, grease has a short life, which is unpreferable.

The kinematic viscosity of the base oil singly used or that of the mixed oil consisting of a plurality of oils is favorably 30 to 200 mm$^2$/second, more favorably 40 to 120 mm$^2$/second, and most favorably 100 to 120 mm$^2$/second.

If the kinematic viscosity of the base oil which is used in the present invention is less than 30 mm$^2$/second at 40° C., the base oil deteriorates in a short period of time. Because a deteriorated substance accelerates deterioration of the entire base oil, the bearing has a lowered durability and has a short life. If the kinematic viscosity of the base oil is more than 200 mm$^2$/second, owing to an increase of the rotational torque, the temperature of the bearing rises, which is unpreferable. The kinematic viscosity of the base oil is measured in accordance with JIS K 2283.

As base oil which can be used by adjusting the amount of naphthenic carbons to 32 to 37%, it is possible to list mineral oil, poly-α-olefin (hereinafter abbreviated as PAO) oil, an ester oil, phenyl ether oil, fluorine oil, and synthetic hydrocarbon oil (GTL base oil) synthesized by Fischer Tropsch reaction. Mixtures of these base oils can be also used.

As the mineral oil, it is possible to use mixed oil prepared by mixing ordinary lubricating oil such as paraffin mineral oil, liquid paraffin, hydrogenated dewaxed oil or the like and substances which are used in the field of grease with naphthene mineral oil which is used as an indispensable component in such a way that the amount of naphthenic carbons is adjusted to 32 to 37%.

As the PAO oil, polymers of α-olefin, copolymers of the α-olefin and olefin, and polybutene are listed. These substances have structures having oligomers which are low polymers of the α-olefin and hydrogen added to the terminal double bond. The polybutene which is one kind of the α-olefin can be also used. The polybutene is produced by polymerizing a starting material containing isobutylene as its main component with a catalyst such as aluminum chloride. The polybutene can be used as it is or by hydrogenating it.

As examples of other α-olefin, it is possible to list 1-octane, 1-nonen, 1-decene, 1-dodecene, 1-tridecene, 1-tetradecene, 1-pentadecene, 1-hexadecene, 1-heptadecene, 1-octadecene, 1-nonadecene, 1-eicosane, 1-docosane, and 1-tetracosane. Normally, mixtures of these substances are used.

As the mixing ratio of the base oil which is used in the present invention, the base oil is contained at favorably 60 to 98 and more favorably 70 to 95 mass % for the entire grease.

If the mixing ratio of the base oil is less than 60 mass %, the grease is hard and thus has a low lubricating performance at a low temperature. If the mixing ratio of the base oil is more than 98 mass %, the grease is soft and thus liable to leak.

As the thickener which can be used for the grease of the present invention for use in the hub bearing, metal soap thickeners such as aluminum soap, lithium soap, sodium soap, barium soap, calcium soap, composite aluminum soap, composite lithium soap, composite sodium soap, composite barium soap, and composite calcium soap; urea compounds such as diurea compounds, polyurea compounds are listed. In consideration of durability and fretting resistance, the urea compound is preferable. The urea compound is shown by the following chemical formula (1).

[Chemical formula 2]

(1)

In the formula (1), $R^2$ indicates an aromatic hydrocarbon group having 6 to 15 carbon atoms, and $R^1$ and $R^3$ indicate at least one hydrocarbon group selected from an alicyclic hydrocarbon group and the aromatic hydrocarbon group.

The urea compound is produced by reacting an isocyanate compound and an amine compound with each other. To prevent a reactive free radical from remaining unreacted, it is preferable to mix the isocyanate group of the isocyanate compound and the amino group of the amine compound with each other in an approximately equivalent weight.

In the reaction, after monoamine acid and diisocyanates are reacted sufficiently with each other in the base oil having a temperature of 70 to 110° C., the temperature is risen to 120 to 180° C. at which the mixture is held for 1 to 2 hours. Thereafter the mixture is cooled and homogenizing treatment is carried out by using a homogenizer, a three-roll mill or the like to produce base grease to which various additives are added.

The diurea compound shown by the formula (1) is prepared, for example, by the reaction between diisocyanate and monoamine. As the diisocyanate, it is possible to list phenylene diisocyanate, diphenyl diisocyanate, diphenyl methane diisocyanate, 1,5-naphtylene diisocyanate, 2,4-tolylene diisocyanate, 3,3-dimethyl-4,4-biphenylene diisocyanate, octadecane diisocyanate, decane diisocyanate, and hexane diisocyanate. As the monoamine, it is possible to list octylamine, dodecylamine, hexadecylamine, stearylamine, oleylamine, aniline, p-toluidine, and cyclohexylamine.

In the present invention, alicyclic-aromatic urea compounds or aromatic urea compounds produced by the reaction between aromatic diisocyanate, alicyclic monoamine, and aromatic monoamine or the reaction between the aromatic diisocyanate and the aromatic monoamine are preferable.

The mixing ratio of the thickener which is used in the present invention is favorably 1 to 40 mass % and more favorably 3 to 25 mass % for the entire grease. If the mixing ratio of the thickener is less than 1 mass %, the thickening effect is small, and greasing is difficult. If the mixing ratio of the thickener is more than 40 mass %, the grease becomes so hard that it is difficult to produce a desired effect.

Known additives can be added to the grease of the present invention for use in the hub bearing as necessary in the range in which the additives do not deteriorate the function of the grease. As the additives, it is possible to list an antioxidant such as amine compounds, phenol compounds, sulfur-containing compounds; a wear inhibitor such as sulfur-containing compounds and phosphorus-containing compounds; a rust proof agent such as metal sulfonate and polyvalent alcohol ester; and a detergent dispersant such as metal sulfonate and metal phosphate. These additives can be added to the grease singly or in combination of two or more kinds thereof.

BRIEF DESCRIPTION OF THE SEVERAL VIEWS OF THE DRAWINGS

FIG. 1 shows an example (third generation hub bearing for use in driven wheel) (GEN3) of the hub bearing of the present invention. FIG. 1 is a sectional view of the hub bearing. A hub bearing 6 has an inward member 5 having a hub ring 1 and an inner ring 2 and an outward member 3 consisting of an outer ring, and double row rolling elements 4, 4. The hub ring 1 has a wheel-mounting flange 1d integral with the hub ring 1 at its one end for mounting a wheel (not shown) thereon. Formed on a periphery of the hub ring 1 are an inside rolling surface 1a and a small-diameter stepped portion extended axially from the inside rolling surface 1a.

Figure 1:
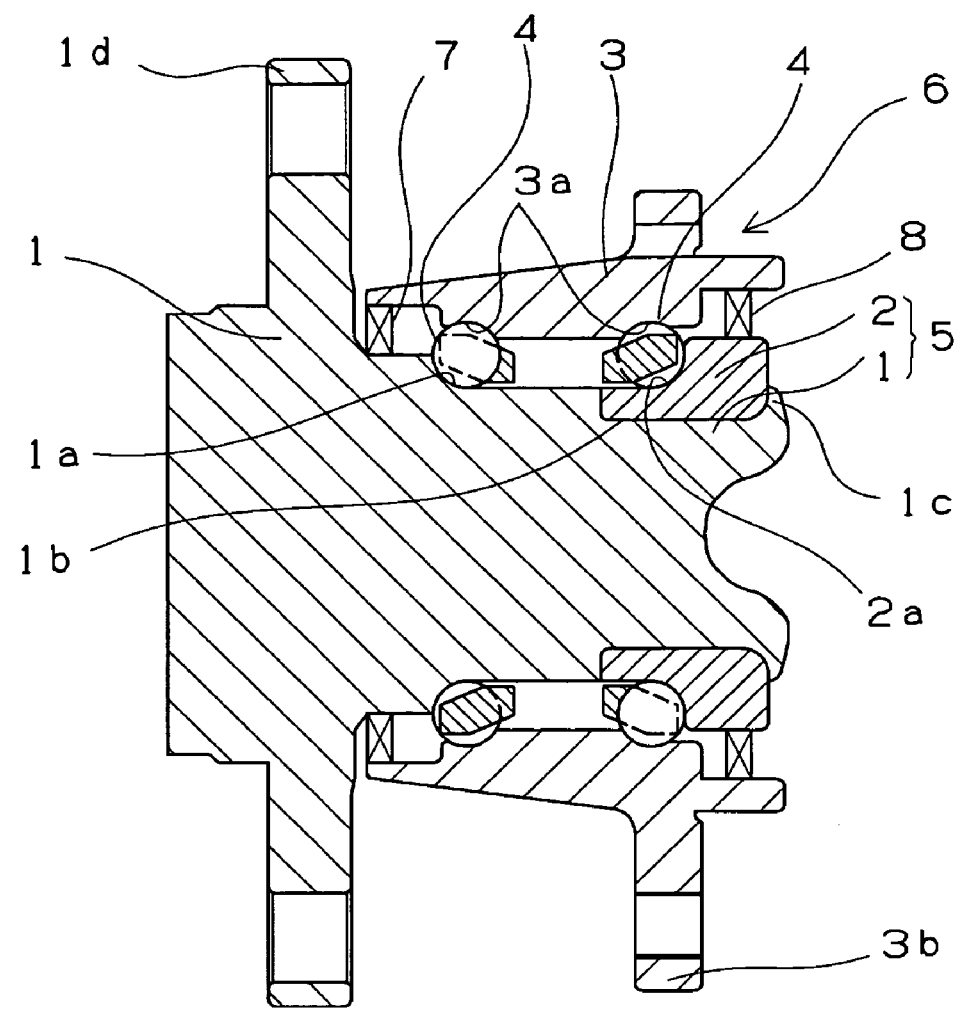
FIG. 1 is a sectional view of a hub of the invention.

In the present specification, "outside" in the axial direction means an outer side in the widthwise direction in a state where the hub bearing is mounted on a car, whereas "inside" means a central side in the widthwise direction.

The inner ring 2 having an inside rolling surface 2a formed on the periphery thereof is fitted in the small-diameter stepped portion 1b of the hub ring 1 by press fit. The removal of the inner ring 2 from the hub ring 1 in the axial direction is prevented by a caulking portion 1c formed by plastically deforming an end of the small-diameter stepped portion 1b of the hub ring 1 radially outward.

The outward member 3 has on its periphery a flange 3b which is mounted on a car and integral therewith and has on the inner periphery the double row rolling elements 4, 4 rollingly accommodated between the outside rolling surfaces 3a, 3a and the inside rolling surfaces 1a, 2a opposed to the double row outside rolling surfaces 3a, 3a.

The grease of the present invention for use in the hub bearing is enclosed in the space surrounded with a sealing member 7, the outward member 3, a sealing member 8, the inward member 5, and the hub ring 1 so that the grease covers the periphery of the double row rolling elements 4, 4 sandwiched between the outward member 3 and the inward member 5 and lubricates the rolling contact portion between the rolling surfaces of the rolling elements 4, 4 and the inside rolling surfaces 1a, 2a as well as the outside rolling surfaces 3a, 3a.

The grease of the present invention for use in the hub bearing can be also used for bearings other than the hub bearing to which a high load is applied.

As materials that can be used for the hub bearing of the present invention, it is possible to list bearing steel, carburized steel, and carbon steel for machine structural use of these steels, it is preferable to use the carbon steel for machine structural use such as S53C which has a favorable forgeability and is inexpensive. The carbon steel for machine structural use is generally used after the rolling fatigue strength of the bearing portion is secured by heat-treating it with a high-frequency wave. But even though the carbon steel for machine structural use is heat-treated with the high-frequency wave, the carbon steel for machine structural use has a low surface strength and is inferior to the bearing steel in the resistance to the peeling starting from the surface of the bearing at the rolling contact portion. By improving the lubricating performance of the grease of the present invention for use in the hub bearing at the rolling contact portion, it is possible to prevent the peeling starting from the surface of the hub bearing made of the carbon steel for machine structural use.

EXAMPLES

The present invention is described in detail byway of examples and comparative examples, but not restricted thereby.

Adjustment of Kinematic Viscosity of Base Oil

A mineral oil 1 and a mineral oil 2 described below were mixed with each other at mixing ratios shown in table 1 to produce base oil having the amount of naphthenic carbons shown in table 1. These base oils were used in each of the examples and the comparative examples.

Mineral oil 1: Superoil N100 produced by Nippon Oil Corporation, amount of naphthenic carbons: 29.0%, paraffin carbon amount: 65.5%, aromatic carbon amount: 5.5%, and kinematic viscosity at 40° C.: 93.9 mm$^2$/second Mineral oil 2: CLESAF F150 produced by Nippon Oil Corporation, amount of naphthenic carbons: 40.8%, paraffin carbon amount: 46.6%, aromatic carbon amount: 12.6%, and kinematic viscosity at 40° C.: 151 mm$^2$/second

Examples 1 through 4 and Comparative Examples 1 and 2

In 2000 g of a base oil having the amount of naphthenic carbons shown in table 1, 193.5 g of diphenyl methane-4,4'-diisocyanate, 82.8 g of p-toluidine, and 76.6 g of cyclohexylamine were allowed to react with one another. The generated urea compound was uniformly dispersed to produce mineral oil/urea base grease (JIS consistency No. 2 grade, consistency: 265 to 295).

As additives, one part by weight of sorbitan trioleate which is a rust proof additive, one part by weight of calcium sulfonate, and two parts by weight of alkyldiphenylamine which is an antioxidant were added to 100 parts by weight of the base grease.

A two-cylinder test and a high-temperature high-speed test were conducted on each grease for hub bearing to evaluate the resistance to the peeling from the surface and the life thereof. Table 1 shows the results.

Example 5

In 2000 g of the base oil having the amount of naphthenic carbons shown in table 1, 309.2 g of the diphenyl methane-4,4'-diisocyanate, 132.4 g of the p-toluidine, and 122.5 g of the cyclohexylamine were allowed to react with one another. The generated urea compound was uniformly dispersed to produce mineral oil/urea base grease (JIS worked penetration No. 2 grade, worked penetration: 265 to 295).

As additives, one part by weight of sorbitan trioleate which is a rust proof additive, one part by weight of calcium sulfonate, and two parts by weight of alkyldiphenylamine which is an antioxidant were added to 100 parts by weight of the base grease.

The prepared grease for the hub bearing was evaluated in a manner similar to that of the example 1. Table 1 shows the results.

TABLE 1

|  | Example | | | | | Comparative example | |
| --- | --- | --- | --- | --- | --- | --- | --- |
|  | 1 | 2 | 3 | 4 | 5 | 1 | 2 |
| Property of mixed base oil |  |  |  |  |  |  |  |
| Amount of naphthenic carbons[1] (%) | 32.5 | 33.7 | 35 | 36.1 | 35 | 29 | 38.4 |
| Kinematic viscosity at 40° C. (mm$^2$/sec) | 105 | 112 | 118 | 124 | 118 | 93.9 | 134 |
| Mixing ratio (mass %) |  |  |  |  |  |  |  |
| Base oil |  |  |  |  |  |  |  |
| Super oil N100 | 70 | 60 | 50 | 40 | 50 | 100 | 20 |
| CIESAF F150 | 30 | 40 | 50 | 60 | 50 | 0 | 80 |
| Grease |  |  |  |  |  |  |  |
| Base oil | 85 | 85 | 85 | 85 | 78 | 85 | 85 |
| Thickener | 15 | 15 | 15 | 15 | 22 | 15 | 15 |
| Worked penetration (60 strokes) | 285 | 285 | 285 | 285 | 220 | 285 | 285 |
| Evaluation |  |  |  |  |  |  |  |
| Area ratio of peeled portion (%) | 9.8 | 6.3 | 5 | 3.3 | 3.2 | 23.5 | 7.2 |
| Life of grease at 150° C. (hour) | 1350 | 1150 | 1000 | 800 | 950 | 1500 | 400 |
| Comprehensive evaluation | Good | Good | Good | Good | Good | Bad | Bad |

Figure 2:
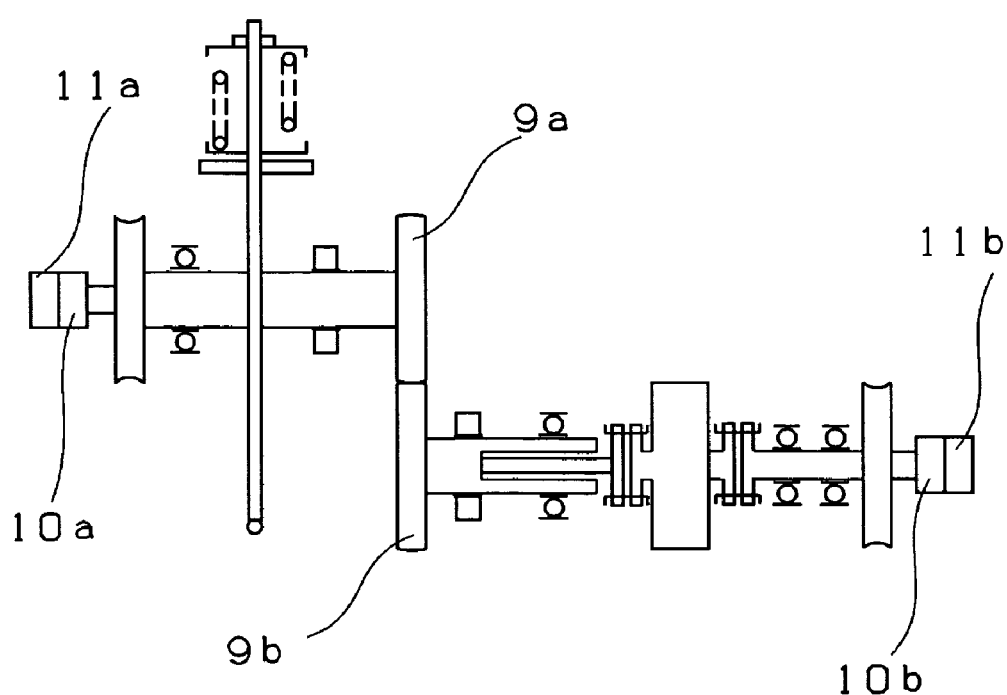
FIG. 2 is schematic view of a two cylinder testing machine for the evaluation of a bearing's resistance to peeling.

[1] Amount of naphthenic carbons = Number of naphthenic carabons x 100/Whole number of carbon atoms Two-cylinder Test The resistance to the peeling starting from the surface was evaluated by using a two-cylinder testing machine. FIG. 2 is a schematic view of the two-cylinder testing machine. In FIG. 2, a driving-side cylinder 9a and a driven-side cylinder 9b are mounted at each end of a rotational shaft thereof. Test conditions of the two-cylinder testing machine are shown in table 2. The shaft of the driving-side cylinder 9a was driven by a motor, whereas the driven-side cylinder 9b was driven by the driving-side cylinder to allow the driven-side cylinder to rotate freely. An SUJ2 standard heat-treated product was used as the driving-side cylinder 9a, whereas a product S53C heat-treated with a high-frequency wave was used as the driven-side cylinder 9b. Each specimen has a surface hardness of HRC (Rockwell hardness C scale) 60 to 63.

The evaluation was made in terms of the area ratio of a peeled portion as viewed in an arbitrary visual field (%, total area of peeled portion×100/total area of visual field). For each specimen grease, the area ratio of the peeled portion were measured at three visual field points on the surface of the driven-side cylinder, and the average values are shown on Table 1.

High-temperature High-speed Test 1.8 g of the grease for the hub bearing of each of the examples and the comparative examples was enclosed in a rolling bearing (6204). A bearing rotating apparatus was rotated at 1000 rpm under an axial load of 67N and a radial load of 67N and at 150° C. in the temperature of an outside diameter of the outer ring of the bearing. The time required for seizing to occur was measured as the life of each grease. Table 1 shows the results.

Comprehensive Evaluation

To comprehensively evaluate specimen grease, grease for hub bearing which had the area ratio of the peeled portion not more than 10% and the life not less than 800 hours was evaluated as excellent in the resistance to the peeling starting from the surface and the durability at high temperature and high speed and judged as "good" in table 1. Grease for hub bearing which had the area ratio of the peeled portion and the life other than the above-described range was regarded as improper and judged as "bad" in table 1.

TABLE 2

| Testing machine | Two-cylinder testing machine |
| --- | --- |
| Driving-side cylinder | SUJ2, φ 39.6 × 12, minor radius of curvature R: 60.3S |
| Driven-side cylinder | S53C, φ 39.6 × 12, 0.2S |
| Number of rotations | 2000 rpm |
| Load | 2156 N |
| Maximum face pressure | 2.3 GPa |
| Load-applied number of times | 4.8 × 10$^5$ times |
| Atmospheric temperature | 15° C. to 25° C. |
| Grease supply method | Grease-applied felt pad is pressed against driving-side cylinder |

In table 1, the grease of each of the examples 1 through 5 using the base oil in which the amount of naphthenic carbons is adjusted to the predetermined range was excellent in the resistance to the peeling starting from the surface and durability at high temperature and high speed. On the other hand, the grease of the comparative example 1 which had a small amount of naphthenic carbons had a large peeled area. The grease of the comparative example 2 which had a large amount of naphthenic carbons had an extremely short life.

INDUSTRIAL APPLICABILITY

Grease of the present invention for use in the hub bearing contains the base oil and the thickener. The amount of naphthenic carbons of the base oil is set to the predetermined range. Therefore it is possible to suppress the peeling, of the hub bearing for use in a car, starting from the surface thereof. The bearing in which the raceway ring is composed of the carbon steel for machine structural use has a long life even though the lubricating condition is strict. Therefore the grease can be preferably utilized for a railway rolling stock, a building machine, an electric auxiliary machine for a car demanded to have a high wear resistance and durability for a long time.

EXPLANATION OF REFERENCE SYMBOLS AND NUMERALS

1: hub ring
1a: inside rolling surface
1b: small-diameter stepped portion
1c: caulking portion
1d: wheel-mounting flange
2: inner ring
2a: inside rolling surface
3: outward member
3a: outside rolling surface
3b: flange to be mounted on car
4: rolling element
5: inward member
6: hub bearing
7: sealing member
8: sealing member
9a: driving-side cylinder
9b: driven-side cylinder
10a: driving-side tachometer
10b: driven-side tachometer
11a: driving-side slip ring
11b: driven-side slip ring

The invention claimed is:

1. A grease for a hub bearing enclosed in said hub bearing for rotatably supporting wheels of a car, comprising a base oil and a thickener, wherein the number of naphthenic carbons in said base oil found by an n-d-M ring analyzing method accounts for 32 to 37% of a whole number of carbon atoms in said base oil.

2. The grease for the hub bearing according to claim 1, wherein said base oil is a mineral oil.

3. The grease for the hub bearing according to claim 2, wherein said mineral oil is a mixed oil of a plurality of mineral oils having different numbers of naphthenic carbons.

4. The grease for the hub bearing according to claim 3, wherein said mixed oil of a plurality of said mineral oils is a mixed oil comprising a mineral oil (A) having the number of naphthenic carbons at less than 32% and a mineral oil (B) having the number of naphthenic carbons at more than 37%.

5. The grease for the hub bearing according to claim 4, wherein said mixed oil consists of 30 to 70 mass % of said mineral oil (A) and 30 to 70 mass % of said mineral oil (B).

6. The grease for the hub bearing according to claim 1, wherein said base oil is a mixed oil of a mineral oil and a synthetic hydrocarbon oil.

7. The grease for the hub bearing according to claim 1, wherein said base oil is contained at 60 to 98 mass % for entire grease.

8. The grease for the hub bearing according to claim 7, wherein said base oil is contained at 65 to 98 mass % for entire grease.

9. The grease for the hub bearing according to claim 1, wherein said thickener is a diurea compound.

10. The grease for the hub bearing according to claim 9, wherein said diurea compound is shown by the following formula (1) and is contained at 1 to 40 mass % for entire grease, (Chemical formula 1)

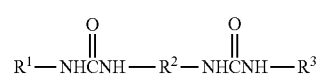

(1)

wherein R$^2$ indicates an aromatic hydrocarbon group having 6 to 15 carbon atoms, and R$^1$ and R$^3$ indicate at least one hydrocarbon group selected from an alicyclic hydrocarbon group and an aromatic hydrocarbon group.

11. The grease for the hub bearing according to claim 1, wherein a material of said hub bearing for rotatably supporting said wheels of said car is carbon steel for machine structural use with a raceway portion thereof heat-treated with a high-frequency wave.

12. A hub bearing having a sliding contact portion made of carbon steel for machine structural use, wherein said grease according to claim 1 is enclosed in said hub bearing.

* * * * *